United States Patent Office 3,209,394
Patented Oct. 5, 1965

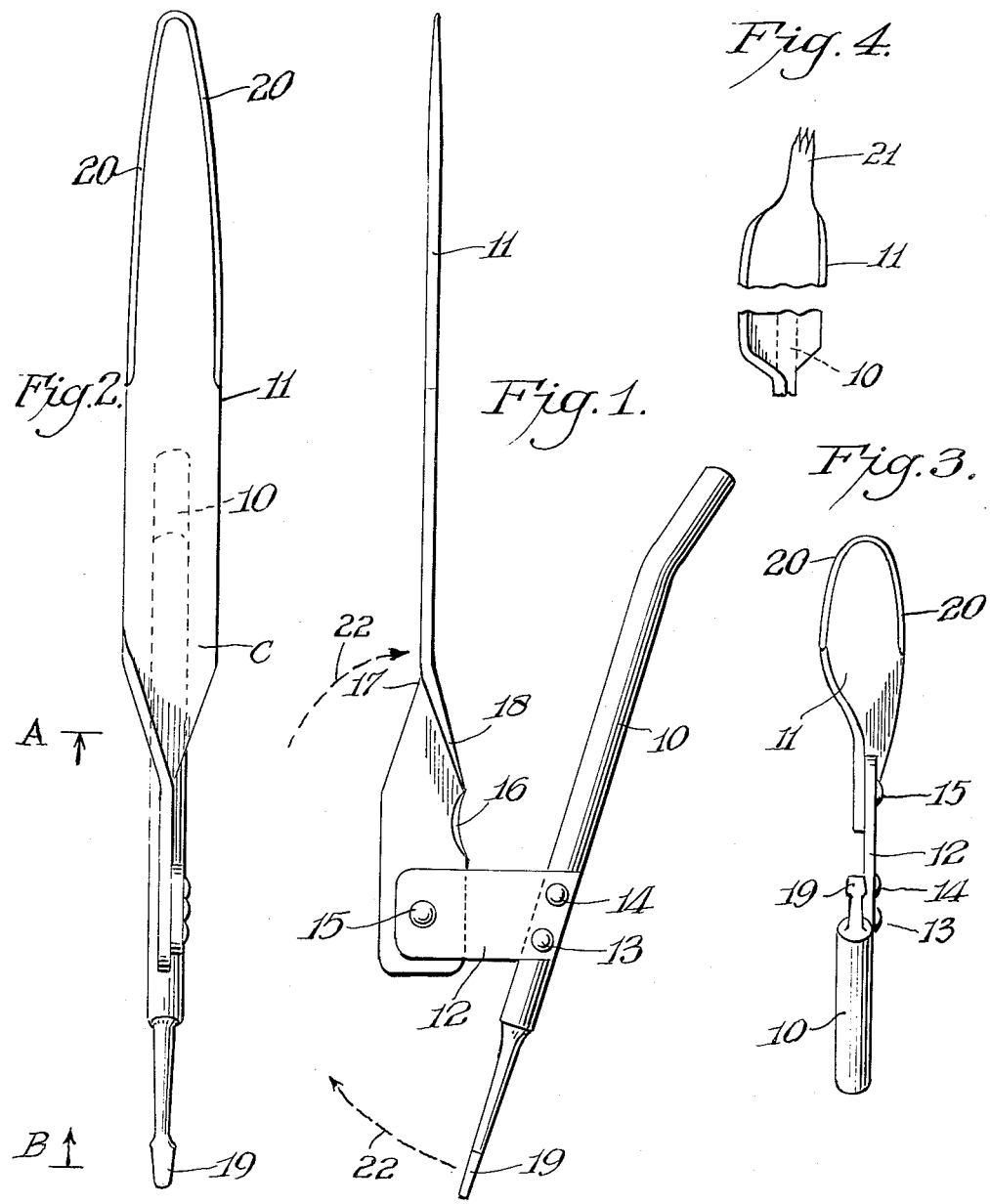

3,209,394
GRIPPING AND CRACKING DEVICE
Erminie B. Hall and David G. Hall, both of 2233 Jamaica Drive, Wilmington, Del.
Filed June 20, 1963, Ser. No. 289,245
7 Claims. (Cl. 17—7)

This invention relates to a tool for cracking the shells of hardshell fish, and more particularly, it relates to an implement for removing food contained in shells, such as lobster meat.

In the home and in many restaurants, lobsters, hardshell crabs, and the like are frequently on the menus. The preparation of this food is difficult because of the need for shucking the knuckles and the like and the enjoyment of the food itself at the dinner table is frequently decreased to a substantial degree by the operations that are needed to get at the meat. The cost of preparation of the food in the restaurants adds substantially to the cost of the dinner on the menu, and it has long been desirable to have more efficacious tools on hand for use in the preparation and in the utilization of the sea foods mentioned.

Accordingly, an objective of this invention is the provision of a tool that provides means for cracking the shells of the hard shell sea food as well as means for extracting the food after the cracking operation is completed.

A further purpose is the provision of an implement which provides a tool for rapidly cracking the shells in an efficient manner and which affords a means for extracting the exposed or partially exposed meats of the hard shell sea foods, thereby giving to the user a single tool that can be readily adapted for several operations with facility and without exposing the user to the hazards of being bruised or cut by the implement or by the hard shells being worked upon by him. These and other objectives will appear hereinafter.

The purposes of this invention are accomplished by the provision of a utensil which comprises two arms or handles pivotably and indirectly connected to each other by means of a third arm which is a spacing arm. Of the said two handles, one bears a pick, and the other bears a scraper element. The two arms cooperate together to form handles which may be brought together to exert gripping and cracking pressure upon any object that is placed between them to be the object in contact with the two arms in the said pressure relationship. At least one of the said arms contains a recessed portion in which the object such as the hard shell of the lobster or crab can be placed. This recess affords a very strong gripping and cutting edge, so that the hard shell is very easily cracked by the user. This invention will be further understood by reference to the drawings and to the description which appear hereinafter and which are given for purposes of illustration and are not limitative.

In the drawings:

FIGURE 1 is a perspective of the device of this invention with the two arms in an open relationship;

FIGURE 2 is a plan view of the device, taken looking downwardly on the scraper blade;

FIGURE 3 is an end view taken from the pick end; and

FIGURE 4 is a plan view, partly broken away, showing another embodiment of an element of this invention.

Referring to FIGURE 1, the device of this invention comprises the arm 10, the arm 11 and the arm 12 in its broadest features, the arm 12 being a spacer to which both arms 10 and 11 are mounted. As shown in FIGURE 1, arm 10 is fixedly mounted at points 13 and 14 to spacer arm 12. The arm 11 is pivotally mounted to the spacer at pivot point 15. In fact, both arms may be pivotably mounted to spacer arm 12 if desired. Generally only one pivot is needed. As to fastening means, only one mounting position corresponding to rivets 13 and 14 need be used, or, if desired, a mounting that is fixed, if any, can be effected by other means such as spot welding, for example.

From FIGURE 1, it will be seen that arm 11 contains a recess 16 in that section nearest that spacer arm 12 and closest to the arm 10.

This cut out section 16 is provided to afford very secure gripping of the object which is to be cracked open so that slippage is prevented and also so that very strong cutting action can be exerted on the said object. The recess can have its edges sharpened if desired. It will be appreciated that as arm 11 is moved downwardly toward arm 10 any object in the grip between these arms will be squeezed together and with increasing pressure, cracking will result.

It is also to be noted from FIGURE 1, that arm 11 has a twist in it at 17 which is about a 90° twist. The recess 16 usually extends from the beginning of the twist forwardly on arm 11 a distance so that when arm 11 is moved into operative position with respect to arm 10 the forward end of recess 16 becomes positioned a bit beyond the first edge of spacer member 12. Thus, the cutting edge of recess 16 also cooperates with arm 12 in the cracking and cutting operation.

The twist is provided primarily to convert the terminating sections of arm 11 into a flat surface, for arm 11 is made of a flat bar of material as opposed to arm 10 which is generally made of rodding, although flat stock can also be used for arm 10 if desired. With the conversion of a vertical bar to a horizontal bar, tapered edges are applied to arm 11 as shown in FIGURE 2 at 20, and these tapered edges can be sharpened or beveled in order to provide a scraping handle or knife. These edges, of course, are not the very sharp cutting edges found on knives in the kitchen but are rather dull, beveled edges that afford a scraping action by the user when the user grips the device of this element from the front end. That is, in this particular use, the user will grab the device so that his fingers are resting on or near a front edge section of arms 10 and arms 11, the spacer arm 12 being in the palm of his hand. Another way of expressing this would be to say that the user grabs the implement shown in the position in FIGURE 2 at the area designated by A–B. His thumb will usually rest on the broad flat surface designated as C in FIGURE 2 and just beyond the twist section 17.

It is to be noted that arm 10 is of such a length that it terminates at the beginning of the scraper element. Thus, if the user grips the device just as described above, arm 10 does not interfere with the scraper. This is so because the user can pivot arm 10 to bring pick 19 into contact with arm 11, as explained below, and then grip the device so that the scraper element extends away from the hand for use as a knife edge or scraper.

The broad blade part of arm 11 has the further advantage in that it affords large gripping surfaces between the spacer arm 12, the flat underside and curved or twisted underside parts of 11 and the tubular surface of arm 10 on which the object to be cracked rests. Still further, the curved section designated at 18 exerts a cutting and cracking force on the shell material gripped in the implement.

It is to be further noted that the arm 10 contains at the front end a pick element 19 which may be an integral part of arm 10. This element enables the user to loosen up, free and dislodge all of the meat that has been exposed upon the cracking and enables the user to do so efficiently, getting into inaccessible corners and crevices. In this use, the operator will grip the device so that the bulk or majority of the arms 10 and 11 will be held in the palm together, and the thumb will quite naturally rest on spacer arm 12 for support or in the curved section of twist 17. The pick 19 has tapered or beveled front and side edges to facilitate the food removal operations. While the pick and scraper may be on the same handle, it is preferred that they not be, because of the greater facility afforded by separate mountings.

Another feature of this device stems from the pivoting of the arms and involves a holding means. Arm 11 can be placed on a plate after swinging arm 10 about 180° or more to a position where it is above arm 11, as shown by the dotted arcing arrow 22 in FIGURE 1. Pick 19 can then be brought into direct contact with the top surface of arm 11 at a point that depends upon the length of the pick. Usually this length is such that contact is made between the end of the twist section 17 and the beginning of the scraper section. With the device in this position it is obvious that the user can place objects between the pick and the top side of arm 11 and use the device as a clamp or holding means while he uses a fork or some other tool to work on the gripped object.

In another modification a small fork, such as the conventional shrimp fork, is made a part of the device. While it can be attached to the scraper blade on a pivot, it is preferred that it replace the pick or the scraper, as desired, in order to keep the number of moving parts at a minimum. In FIGURE 4, fork element 21 is shown as replacing the scraper element, this being for convenience. It is to be understood, however, that pick element 19 may be replaced by fork element 21. Indeed, this replacement is the desirable one if a fork is preferred.

The device of this invention can be prepared from a variety of materials including stainless steel, aluminum, the various silvers and the like. It is of simple construction yet it is a very sturdy device, and it can be used very effectively by the novice as well as by the experienced sea food gourmet. With the simplicity of the device there is an advantage that it can be manufactured at a low cost and can be available in commercial establishments or in the homes much as is any other kitchen or dining table utensil. With its efficiency there is not only a lower loss of food, but there is a greater enjoyment in dining on a hard shell sea food.

While the invention has been disclosed herein in connection with certain embodiments and certain structural and procedural details, it is clear that changes, modifications or equivalents can be used by those skilled in the art; accordingly such changes within the principles of the invention are intended to be included within the scope of the claims below.

We claim:

1. A device for gripping and cracking an object which device comprises a spacing member; two handles independently mounted on and spaced from each other by said spacing member, the first handle being fixed to and near one end of said spacing member and the second handle being fixed to and near the other end of said spacing member and the said handles and spacing member affording means for holding said object and at least one of said handles being pivotably mounted to said spacing member to swing toward the said other handle and away from it as desired and at least one of said handles being fixed to the side of said spacing member at the said fixation end; and in at least one of said handles a recess being positioned in said handle near the point of fixation of said handle to said spacing member and being, with its respective handle, in gripping, cracking and cutting relationship with the other handle.

2. A device in accordance with claim 1 in which one handle is made of a flat strip of material and is tapered at one end with beveled edges to afford a scraping element.

3. A device in accordance with claim 2 in which said strip has about a 90° twist in it at its end nearest said spacing member.

4. A device in accordance with claim 2 in which the said pivotable handle swings through an arc of about 180° to bring the forwardmost end of the one handle into contact with a portion of the upper surface of the said scraping element.

5. A device for gripping and cracking an object which device comprises a spacing member; two handles independently mounted on and spaced from each other by said spacing member, the first handle being fixed to and near one end of said spacing member and the second handle being fixed to and near the other end of said spacing member and the said handles and spacing member affording means for holding said object and at least one of said handles being pivotably mounted to said spacing member to swing toward the said other handle and away from it as desired; a pick device on at least one of said handles at its forward end at least one of said handles embodying a flat strip of material which affords a scraping element; and in at least one of said handles a recess being positioned in said handle near the point of fixation of said handle to said spacing member and being, with its respective handle, in gripping and cracking relationship with the other handle.

6. A device in accordance with claim 5 in which said flat strip has about a 90° twist in it at its end nearest said spacing member.

7. A device in accordance with claim 5 in which said pivotable handle swings through an arc of about 180° to bring the end of the said pick device into contact with a portion of the uppermost surface of the said scraping element.

References Cited by the Examiner

UNITED STATES PATENTS

| D. 195,411 | 6/63 | Henry et al. | 17—7 |
| 512,818 | 1/94 | Hall | 146—13 |
| 888,738 | 5/08 | Proctor | 146—13 |
| 2,758,622 | 8/56 | Greenblatt | 17—7 X |

FOREIGN PATENTS

| 25,386 | 12/83 | Germany. |
| 19,826 | 1911 | Great Britain. |

SAMUEL KOREN, *Primary Examiner.*

LUCIE H. LAUDENSLAGER, ALDRICH F. MEDBERY, *Examiners.*